E. W. WILLIAMSON.
COMBINED PLANTER AND FERTILIZER DISTRIBUTER.
APPLICATION FILED JAN. 21, 1914.
1,126,928.
Patented Feb. 2, 1915.
2 SHEETS—SHEET 2.
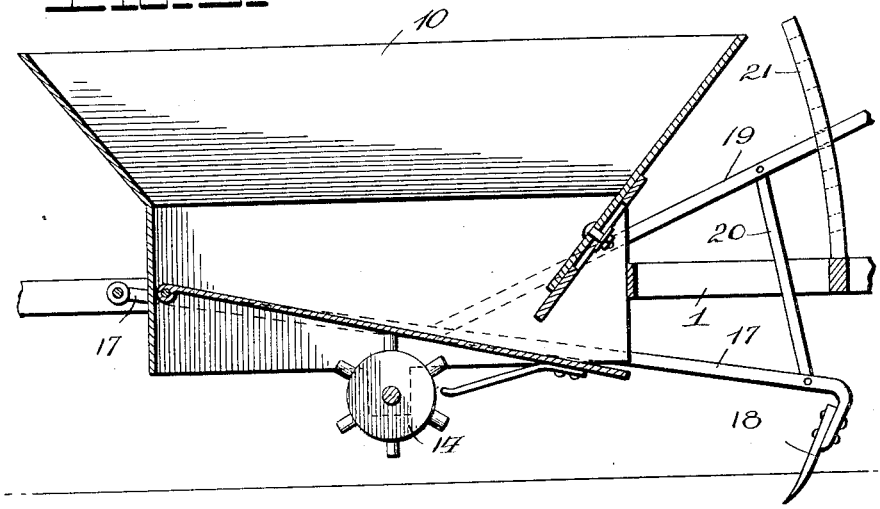
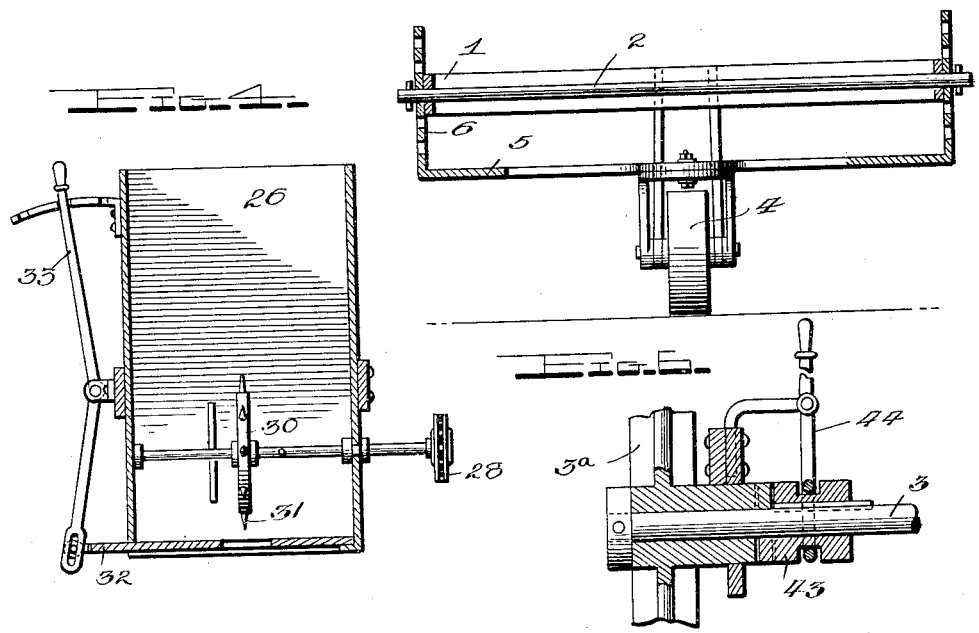
Inventor
E. W. Williamson,
Witnesses

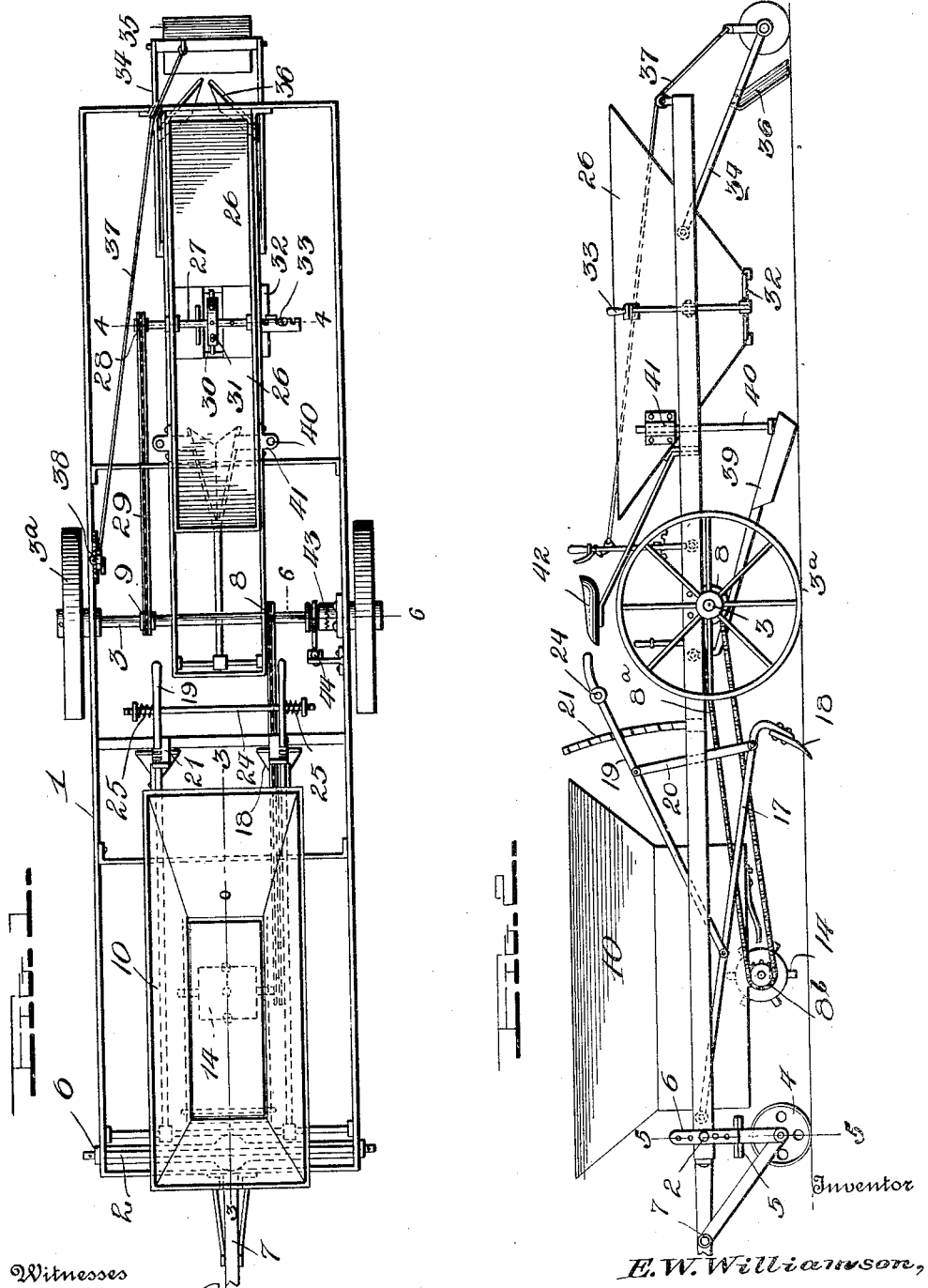

UNITED STATES PATENT OFFICE.

EDWARD WESLEY WILLIAMSON, OF FLORENCE, SOUTH CAROLINA.

COMBINED PLANTER AND FERTILIZER-DISTRIBUTER.

1,126,928.  Specification of Letters Patent.  Patented Feb. 2, 1915.

Application filed January 21, 1914. Serial No. 813,430.

*To all whom it may concern:*

Be it known that I, EDWARD W. WILLIAMSON, a citizen of the United States, residing at Florence, in the county of Florence and State of South Carolina, have invented a new and useful Improvement in Combined Planters and Fertilizer-Distributers, of which the following is a specification.

This invention relates to a combined fertilizer distributer and planter, and the object of the invention is to distribute fertilizer, mix the same with the soil, open a furrow, deposit the seed therein, and cover the same, all by means of the same device and substantially at the same time, whereby, operation will accomplish what might otherwise require a number of separate operations performed at different times by means of different devices and possibly operated by different parties.

The invention consists in the novel features of construction hereinafter described, pointed out in the claim and shown in the accompanying drawings, in which—
Figure 1 is a plan view of the complete device. Fig. 2 is a side elevation. Fig. 3 is a section on the line 3—3 of Fig. 1. Fig. 4 is a section on the line 4—4 of Fig. 1. Fig. 5 is a front view partly in section on line 5—5 of Fig. 2. Fig. 6 is an enlarged section on the line 6—6 of Fig. 1.

In constructing the device I employ a suitable rectangular frame 1 provided with the necessary cross members and said frame is centrally supported by a suitable front wheel 4 which supports a suitable truck 5, said truck comprising vertical side members 6 provided with suitable perforations, the front portion of the frame 1 being supported by a suitable rod 2 adapted to engage with said perforations, and by means of which the front end may be adjusted by raising or lowering the same, or when required by the nature of the ground one side of the frame may be lifted for the purpose of leveling the frame. A suitable tongue 7 is attached to the truck 5.

Mounted upon the rotatable axle 3 are sprocket wheels 8 and 9. Upon the forward portion of the frame is a hopper 10 provided with a forwardly pivoted bottom, said bottom being mechanically actuated by means of the spur wheel 14.

Pivotally connected to the front portion of a frame 1 are shanks 17 of fertilizer mixing plows 18. These plows work to the rear of the hopper 10 and thoroughly mix the fertilizer with the soil. Suitable levers 19 also pivoted at their forward ends are connected by links 20 with the shanks 17 of the plows 18, and said levers work upon suitable ratchets 21. These levers are connected by a common cross rod 24 the ends of which project laterally beyond the levers and are provided with suitable nuts, collars or shanks, and springs 25 are carried by said connecting rod and bear upon the outer faces of the levers, thereby positively holding the same in engagement with the ratchet bars.

Situated upon the rear portion of the frame is a seed hopper 26, said hopper being provided with a shaft 27 upon which is placed a sprocket wheel 28 and a chain 29 runs from this sprocket wheel to the sprocket wheel 9 upon the axle 3. The shaft 27 carries within the hopper 26 a feed wheel 30 and a suitable agitator fingers 31, it is also provided with a slide 32 operated by a lever 33 whereby the opening at the bottom of the hopper can be increased or decreased so as to regulate the amount of seed delivered from the hopper by the feed wheel. This hopper is especially adapted for the planting of cotton seed although I do not wish to be limited to the planting of any particular seed.

A rear pivoted frame 34 carries a roller 35 and in advance of said roller said frame carries suitable seed covering devices 36.

A cable 37 runs from the frame 34 to a suitable lever 38, by means of which the frame 34 may be adjusted and if desired it can be lifted entirely clear of the ground.

Intermediate the two hoppers there is pivotally connected to the frame a suitable furrow opening device 39. Said device being provided with uprights 40 which are adapted to work vertically in guide ways 41 carried by opposite sides of the hopper 26, thereby permitting limited vertical movement of the opener 39 but preventing any swinging side movement. This insures a straight furrow but at the same time permits the furrow opener 39 to ride over any obstruction. A suitable seat 42 is also arranged between the hoppers.

Main side wheels 3ª are loosely mounted on the axle 3 and adjacent one of the wheels a clutch member 43 is keyed upon the axle and a suitable clutch operating lever 44 is adapted to shift the member 43 into engagement with the ratchet portion of the hub thereby locking one of the wheels to the axle, causing the axle to rotate with said wheel.

What I claim is:—

A device of the kind described comprising a centrally mounted frame, means for supporting the front end of the frame, the front end being vertically adjustable with respect to said supporting means, a fertilizer distributer mounted upon the forward end of the frame, said distributer comprising a vertically movable bottom, means actuated by travel of the frame for rocking said bottom, plow shanks pivotally connected to the front of the frame and extending rearwardly upon opposite sides of said distributer, mixing plows carried by said shanks, a vertically movable furrow opener arranged to the rear of said plows and in line with said distributer, a seed hopper arranged upon the frame to the rear of said furrow opener and in alinement therewith a rear frame pivotally connected to the first mentioned frame, covering devices carried by the rear frame, and a roller carried thereby.

EDWARD WESLEY WILLIAMSON.

Witnesses:
C. E. GREGG,
J. M. SHULEN.

Copies of this patent may be obtained for five cents each, by addressing the "Commissioner of Patents, Washington, D. C."